US006997967B2

(12) United States Patent
Storz

(10) Patent No.: US 6,997,967 B2
(45) Date of Patent: Feb. 14, 2006

(54) INTAKE SYSTEM

(75) Inventor: Eberhard Storz, Kirchheim (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 81 days.

(21) Appl. No.: 10/702,585

(22) Filed: Nov. 7, 2003

(65) Prior Publication Data
US 2004/0093839 A1 May 20, 2004

(30) Foreign Application Priority Data
Nov. 20, 2002 (DE) ................... 102 54 134
Apr. 3, 2003 (DE) ................... 103 15 346

(51) Int. Cl.
B01D 46/00 (2006.01)
(52) U.S. Cl. ............ 55/385.3; 55/418; 55/495; 55/DIG. 28; 180/219; 123/198 E
(58) Field of Classification Search ............. 55/385.3, 55/418, 495, DIG. 28; 180/219; 123/198 E
See application file for complete search history.

(56) References Cited
U.S. PATENT DOCUMENTS 4,373,330 A * 2/1983 Stark ..................... 60/311
4,648,474 A * 3/1987 Shinozaki et al. .......... 180/219
4,899,540 A * 2/1990 Wagner et al. .............. 60/274
5,609,658 A * 3/1997 Takemura et al. ........ 55/385.3
5,655,497 A * 8/1997 Nakajima ............... 123/198 E
6,251,151 B1 * 6/2001 Kobayashi et al. ........... 55/309
6,325,169 B1 * 12/2001 Tateshima et al. .......... 180/219
6,395,049 B1 * 5/2002 Knodler et al. ........... 55/385.3
6,409,783 B1 * 6/2002 Miyajima et al. ......... 55/385.3
6,688,274 B1 * 2/2004 Yokoyama et al. ..... 123/198 E
2002/0124734 A1 9/2002 Spannbauer et al.

FOREIGN PATENT DOCUMENTS

DE 1969376 9/1967
DE 19849089 4/2000
DE 199 40 610 A1 3/2001

OTHER PUBLICATIONS

German Office Action with partial English-language translation.

* cited by examiner

Primary Examiner—Minh-Chau T. Pham
(74) Attorney, Agent, or Firm—Crowell & Moring LLP

(57) ABSTRACT

In order to make an air filter housing usable for several types of engines, the air filter housing is provided with outlets branching off the cleaned-air chamber, in which case each outlet can optionally be closed off tightly according to the type of used engine.

18 Claims, 4 Drawing Sheets

INTAKE SYSTEM

This application claims the priority of German Patent Documents 102 54 134.5 (filed Nov. 20, 2002) and 103 15 346.2 (filed Apr. 3, 2003), the disclosures of which are expressly incorporated by reference herein.

BACKGROUND AND SUMMARY OF THE INVENTION

The invention relates to an intake system for uncleaned and cleaned air through an air filter of an internal-combustion engine.

German Patent Document DE 199 40 610 A1 discloses an air filter for an internal-combustion engine, which comprises an air filter housing with a filter insert which comprises a first housing chamber with an inlet for uncleaned air and an adjoining second housing chamber with an outlet for cleaned air, which is connected with an air pipe.

It is an object of the invention to provide an air filter housing which is optionally suitable for a use with different engines and engine compartment conceptions.

The invention is an intake system for uncleaned and cleaned air through an air filter of an internal-combustion engine of a motor vehicle, the air filter comprising an air filter housing, which is divided by means of a filter insert into two housing chambers, one housing chamber having an inlet for uncleaned air and the adjoining housing chamber having an outlet for cleaned air.

The principal advantages achieved by means of the invention are that, as a result of the construction of the air filter housing with two outlets for cleaned air, an identical air filter housing can be used for different engines, such as six- and eight-cylinder V-engines respectively or eight and twelve-cylinder W-engines respectively. For this purpose, the air filter housing of the present invention for the cleaned air has a housing section with opposed outlets for the cleaned air. Each outlet for the cleaned air can be closed off depending on the used engine, and the outlet which is not closed off can be connected with an air pipe.

The construction of the engines or the conception of the engine compartment requires that the air outlets for the cleaned air are opened either—viewed in the driving direction—in the driving direction or against the driving direction. For this purpose, it is also provided according to the invention that, in a first version, a cleaned-air outlet—with respect to the driving direction F of FIG. 4 is opened in the driving direction and is in each case connected with an air pipe 12, 13, which has an air outlet opening opened against the driving direction F. The additional cleaned-air outlet in the housing section is closed off tightly.

In another version, the cleaned-air outlet—with respect to the driving direction of the vehicle—is opened against the driving direction and is connected with one air pipe respectively which has an air outlet opening opened in the driving direction. The additional cleaned-air outlet in the housing section is closed off tightly.

As a result of this construction of the air housing with two air outlets, an adaptation to various engines can be carried out in a simple manner, in which case the cleaned-air outlet can be closed off by means of a cover or a wall molded into the outlet of the housing.

The closing of the not used outlet opening in the housing section can take place by way of the molded-on wall which is injection-molded-on or produced during the manufacturing of the air filter housing, so that this wall forms one piece with the housing. When such a wall does not exist, a cover is used which can be snapped on or can be fixed to the housing section, which cover ensures a tight closure.

For connecting a cleaned-air pipe with the air filter housing, a connection piece is provided which has a surrounding flange which can be firmly and tightly connected with a collar of the housing section.

Other objects, advantages and novel features of the present invention will become apparent from the following detailed description of the invention when considered in conjunction with the accompanying drawings.

DETAILED DESCRIPTION OF THE DRAWINGS

Figure 1:
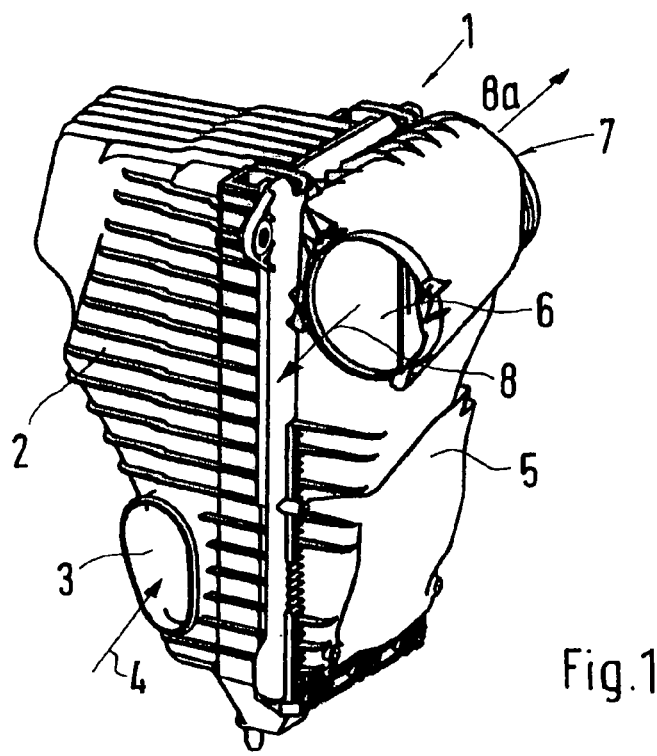
FIG. 1 is a diagram of an air filter with an air inlet for uncleaned air and air outlets for cleaned air.

An air filter housing 1 according to FIG. 1 for an internal-combustion engine comprises a first housing section 2 with an inlet 3 for uncleaned air 4 and an adjoining second housing section 5 which is separated by way of a filter element (not shown) and has outlets 6, 7 for cleaned air 8, 8a.

Figure 3:
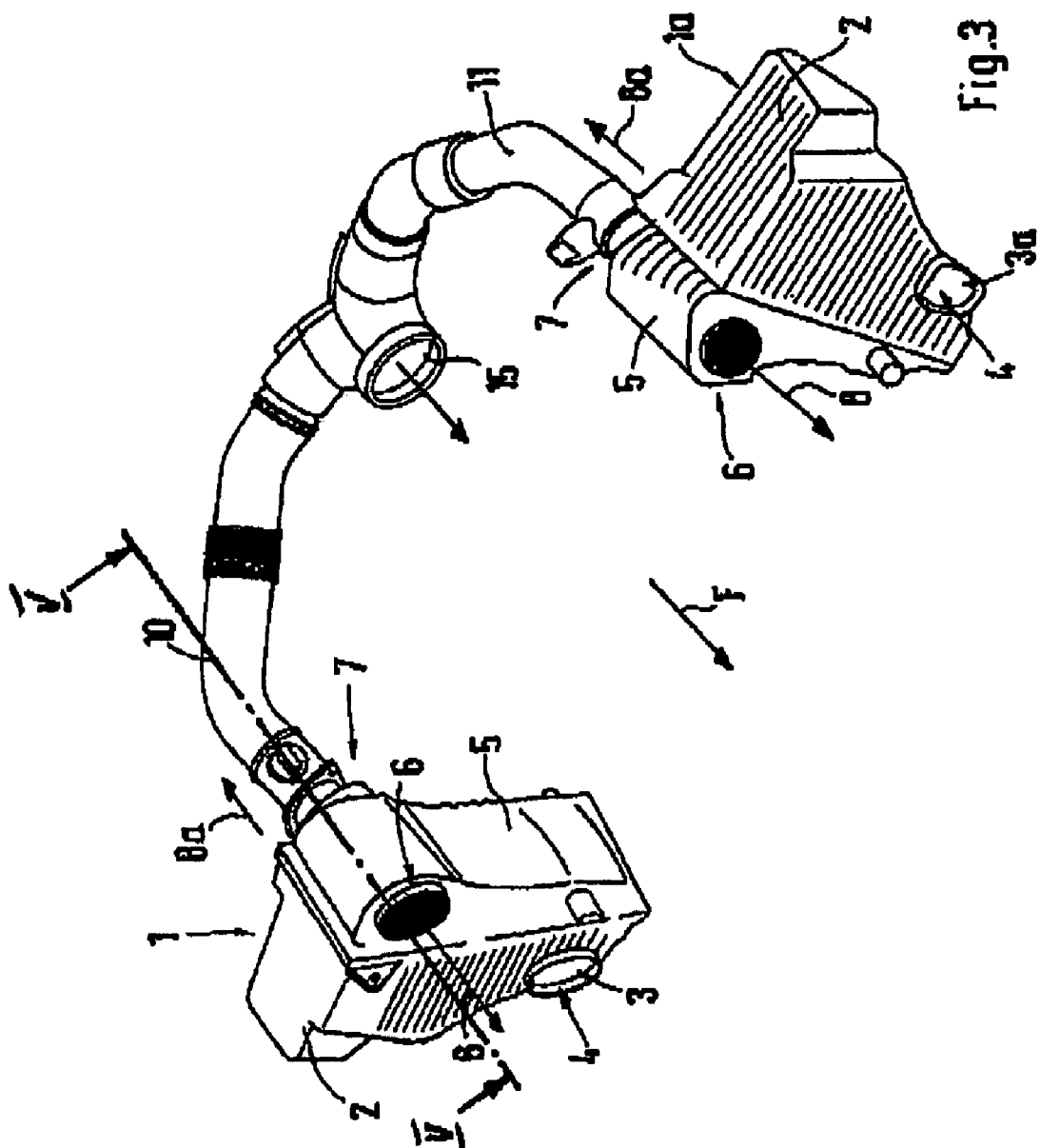
FIG. 3 is a diagram of two air filter housings and air outlets for cleaned air which are opened against the driving direction.

As illustrated in FIG. 3 in a first variant, an air filter housing 1, 1a is arranged on both sides of the engine. By way of the air inlet 3, 3a, uncleaned air 4 is received by the first chamber 2 in the housing section 2 and is guided by way of the filter element into the adjoining second chamber 5 of the additional housing section 5. From here, the cleaned air 8a is guided to the outlet 7 which is adjoined by air pipes 10, 11 with a common air outlet opening 15 opened in the driving direction F. The outlets 7 in the housing 5 are opened against the driving direction F, the additional outlets 6 then being tightly closed off.

Figure 4:
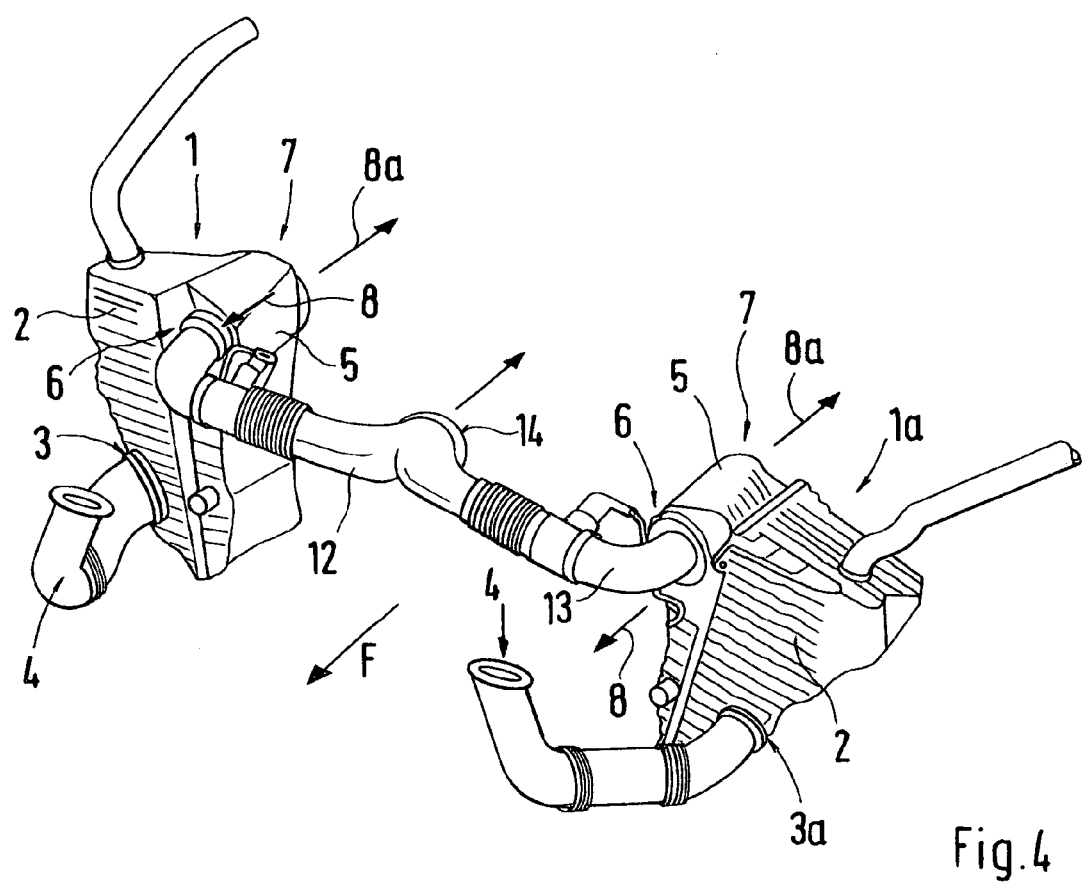
FIG. 4 is a diagram of two air filter housings and air outlets for cleaned air which are opened in the driving direction.
Figure 5:
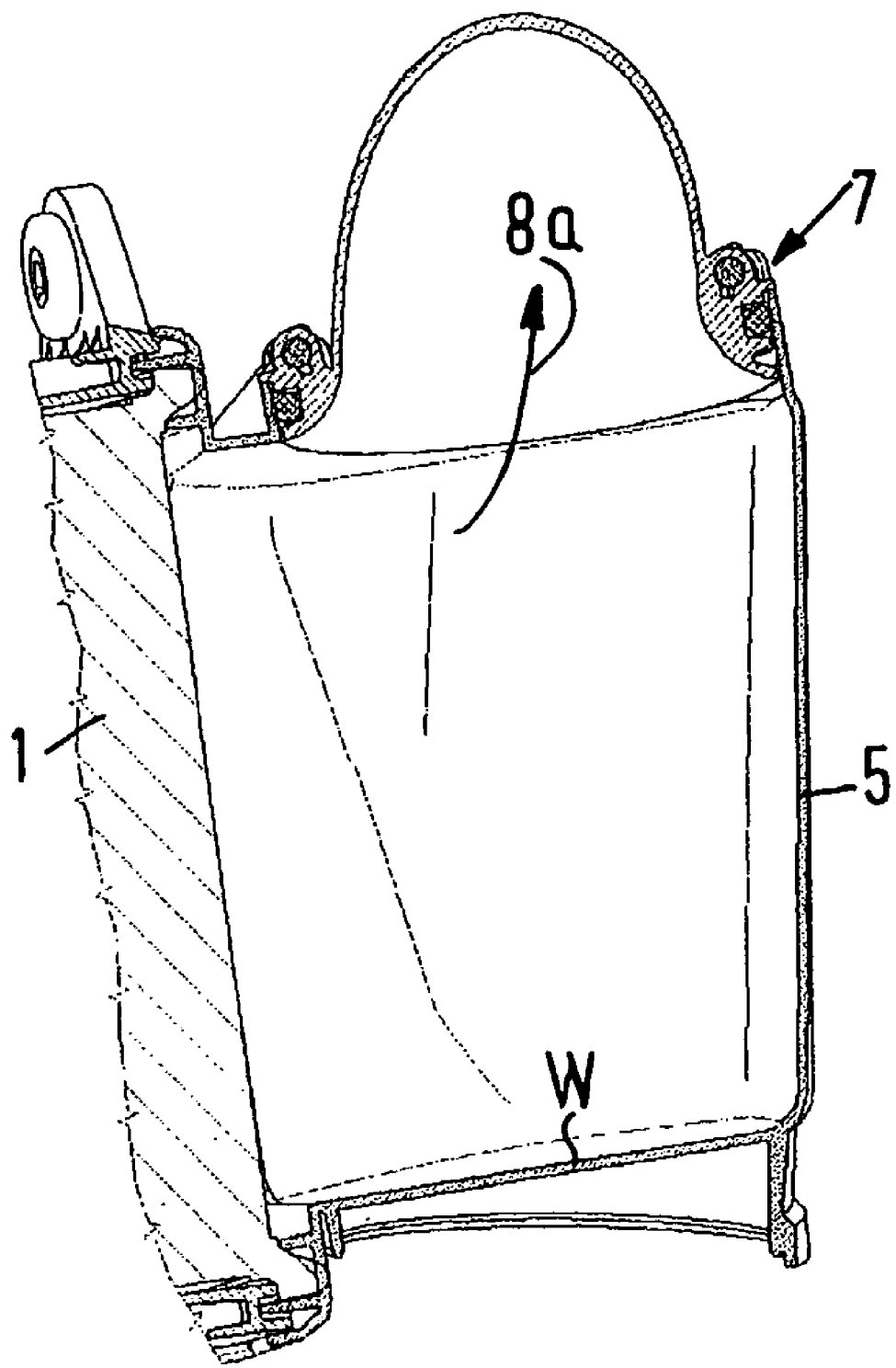
FIG. 5 is a sectional view according to Line V—V of FIG. 3 which has a closing cover at the outlet of the housing section.

FIG. 4 shows another variant of the air guiding housing 1, 1a, in which the outlets 6 for the cleaned air 8 are opened in the driving direction F. In contrast, the outlets against the driving direct F are closed off tightly by means of a shaped-out wall W or a cover (FIG. 5). The outlets 6 are adjoined by connecting pipes 12, 13 which have a common air outlet opening 14 which is opened against the driving direction F.

Figure 2:
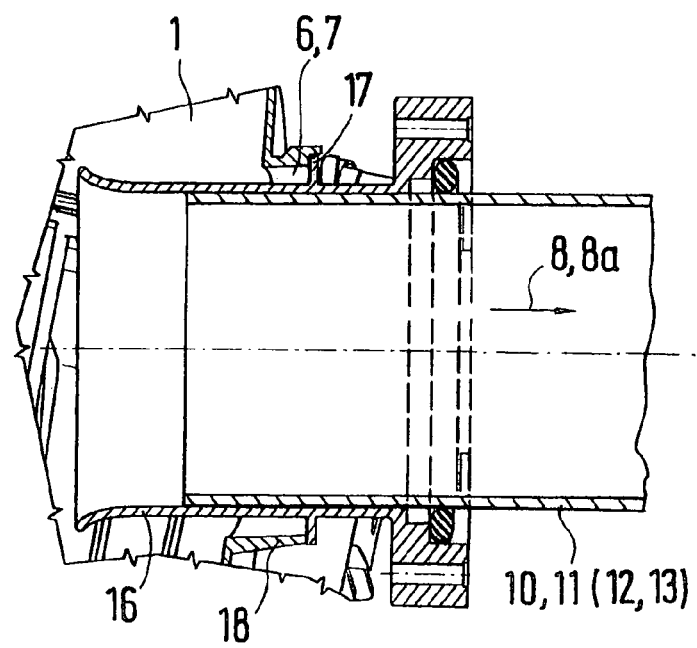
FIG. 2 is a sectional view of a connection piece for a cleaned-air pipe inserted into the air filter housing.

FIG. 2 is an enlarged view of an outlet 6, 7 for the cleaned air in the chamber of the housing section 5 of the air filter housing 1, 1a. A connection piece 16 is inserted into this outlet 6, 7 and has a surrounding flange 17 which, in the installed condition, rests against a collar 18 of the housing section 5 and is fixedly connected with the latter. The connection pipe 10, 11 and 12, 13 respectively can be inserted into the connection piece.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Intake system for uncleaned and cleaned air through an air filter of an internal-combustion engine of a motor vehicle, the air filter comprising an air filter housing, which is divided by a filter insert into two housing chambers, one housing chamber having an inlet for uncleaned air and the adjoining housing chamber for cleaned air, wherein the housing chamber for cleaned air has opposed outlets for cleaned air, and one of the outlets is closed off depending on the engine used, and the outlet which is not closed off is connectable with an air pipe and respectively.

2. Intake system according to claim 1, wherein the cleaned-air outlet—with respect to the driving direction of the vehicle—is opened in the driving direction and is connected with one air pipe respectively, which has an air outlet opening opened against the driving direction, the additional cleaned-air outlet in the housing section being tightly closed off.

3. Intake system according to claim 1, wherein the cleaned-air outlet—with respect to the driving direction of the vehicle—is opened against the driving direction and is connected with one air pipe respectively, which has an air outlet opening opened in the driving direction, the additional cleaned-air outlet in the housing section being tightly closed off.

4. Intake system according to claim 1, wherein the cleaned-air outlet and can be closed off by means of a cover or a wall molded into the outlet or of the housing.

5. Intake system according to claim 1, wherein the cleaned-air outlet is connected with a connection piece for the air pipes and respectively which comprises a surrounding flange which can be connected with a collar of the housing section.

6. An intake system for clean air comprising:
a filter of an internal-combustion engine of a motor vehicle, the filter including
a filter insert, and
a filter housing including into first and second adjoining housing sections divided by the filter insert, the first housing section having an inlet for unfiltered air and the second housing section having opposed outlets for filtered air, and one of the outlets being closed off depending on the engine used, and the other outlet being open and being connectable with an air pipe.

7. The intake system according to claim 6, wherein the open outlet opens in the same direction as the driving direction of the vehicle, and the air pipe has an air outlet opening that opens in a direction opposite of the driving direction.

8. The intake system according to claim 6, wherein the open outlet opens in the opposite direction as the driving direction of the vehicle, and the air pipe has an air outlet opening that opens in the same direction as the driving direction.

9. The intake system according to claim 8, wherein the closed outlet is closed off with a cover or a wall molded into the filter housing.

10. The intake system according to claim 7, wherein the closed outlet is closed off with a cover or a wall molded into the filter housing.

11. The intake system according to claim 6, wherein the closed outlet is closed off with a cover or a wall molded into the filter housing.

12. The intake system according to claim 11, wherein the air pipe includes a connection piece having a surrounding flange, wherein the clean air outlet is connected with the connection piece of the air pipe, and wherein which the surrounding flange is connectable with a collar of the housing.

13. The intake system according to claim 6, wherein the air pipe includes a connection piece having a surrounding flange, wherein the clean air outlet is connected with the connection piece of the air pipe, and wherein which the surrounding flange is connectable with a collar of the housing.

14. A method of making an intake system for clean air, the method comprising the steps of:
placing a filter insert of a filter of an internal-combustion engine in a filter housing of the filter to divide the filter housing into first and second housing sections;
installing an inlet for unfiltered air in the first housing section;
installing opposed outlets for filtered air in the second housing section;
closing off one of the outlets based on the type of the engine;
keeping the other outlet open; and
connecting the open outlet with an air pipe.

15. The method according to claim 14, further comprising the step of aligning the open outlet in the same direction as the driving direction of the vehicle, and providing the air pipe with an air outlet opening that is aligned in a direction opposite of the driving direction.

16. The method according to claim 14, further comprising the step of aligning the open outlet in the opposite direction as the driving direction of the vehicle, and providing the air pipe with an air outlet opening that is aligned in the same direction as the driving direction.

17. The method according to claim 14, further comprising closing the closed outlet with a covet or a wall molded into the filter housing.

18. The method according to claim 14, wherein the air pipe includes a connection piece having a surrounding flange, the method further comprising the step of connecting the clean air outlet with the connection piece of the air pipe and connecting the surrounding flange with a collar of the housing.

* * * * *